Patented Nov. 29, 1938

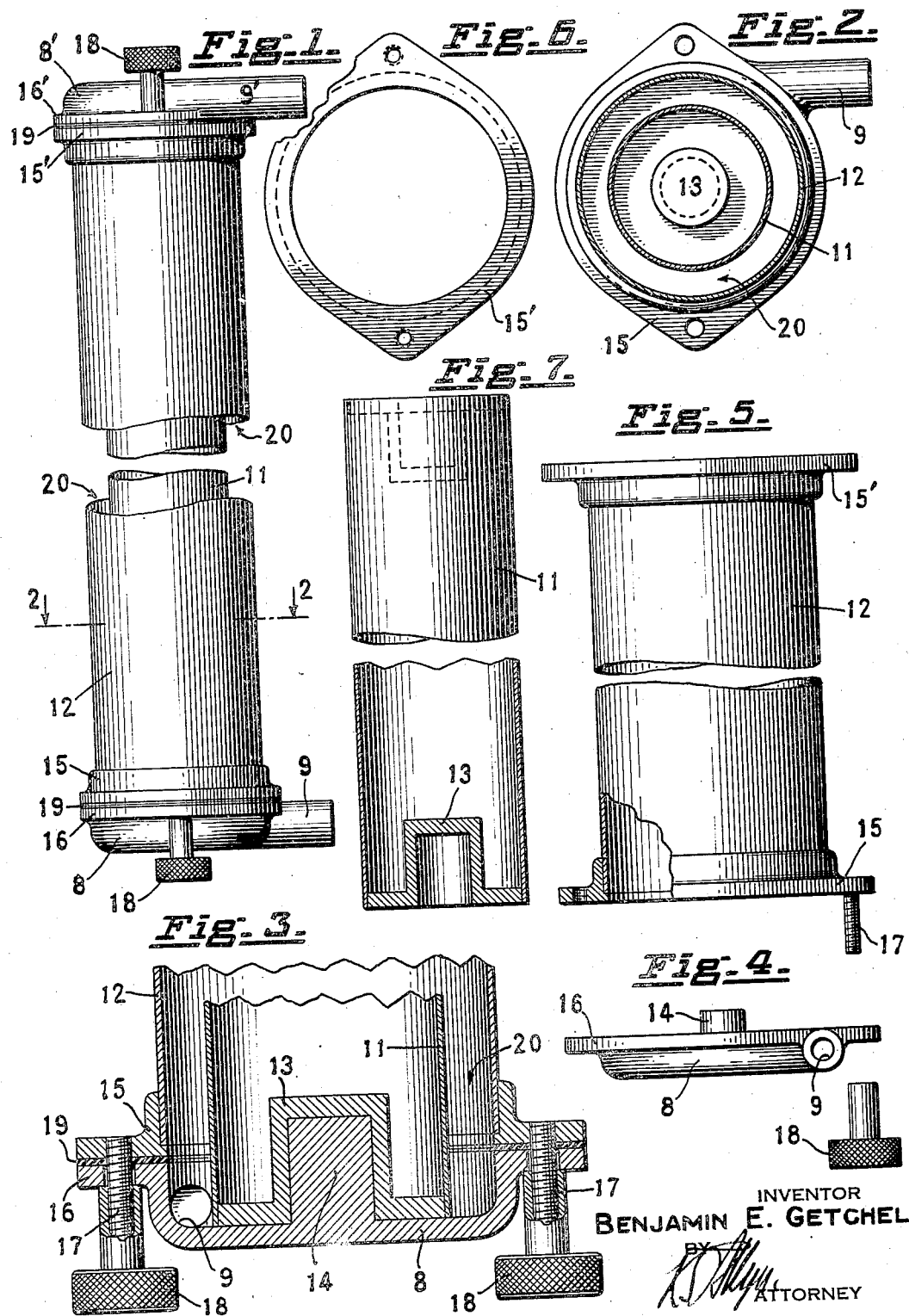

2,138,402

UNITED STATES PATENT OFFICE 2,138,402

HOLDING CHAMBER FOR PASTEURIZING SYSTEM

Benjamin E. Getchell, Plainville, Conn., assignor to The Trumbull Electric Manufacturing Company, Plainville, Conn., a corporation of Connecticut Application December 5, 1936, Serial No. 114,315

5 Claims. (Cl. 137—21)

My invention relates to improvements in apparatus particularly intended for the pasteurization of milk. United States Letters Patent #2,052,396 shows a system for the treatment of milk electrically as it flows continuously. My present invention relates especially to that part of the apparatus commonly termed a holding chamber which is provided for maintaining the milk at its pasteurizing temperature for a predetermined length of time before the milk is cooled.

In the pasteurization of milk it is of the greatest importance that the milk be heated uniformly to the required temperature and maintained uniformly at the pasteurizing temperature for the required length of time without permitting any particle of the milk to stand still or become pocketed in the apparatus.

The principal object of the invention is to cause all liquid to leave the holding chamber at the sequence at which it enters. For this purpose it is necessary that the same speed of flow be maintained by all of the liquid so that it will be impossible for portions of the liquid to run ahead and other portions to lag behind the remainder of the flow.

Another important object is to provide a simple form of construction consisting of few parts which can be readily assembled and taken apart and readily cleaned. It is especially important that it be easy to clean and sterilize all parts of the apparatus.

Another object is to provide apparatus of this character which can be manufactured at a reasonable cost.

Another object is to provide a construction which is rugged and therefore not likely to be damaged by being thrown out of adjustment, roughly handled, or by frequent cleaning operations.

In the continuous flow system of the character described it is essential that we provide a chamber through which it will take the liquid a definite time to pass at a predetermined rate of flow for which purpose it must have a certain volume capacity. It is possible, of course, to obtain the desired capacity by increasing the cross section of the pipe or by lengthening the pipe or by repassing the liquid. All of these methods are objectionable. When the cross section of the pipe is unduly increased it results in a telescoping or more rapidly central flow of the liquid thus allowing some parts of the liquid to pass through more quickly than other parts. When the length of the holding chamber or pipe is unduly increased an undesirable amount of radiating surface is produced so that the temperature is not maintained properly throughout the holding period. When baffles are provided in a holding chamber it is still difficult to maintain a uniform flow of liquid and such devices are quite difficult to clean.

Long experience has shown that any form of apparatus in which eddies are likely to occur is undesirable. When eddies do occur portions of the liquid flow at different rates. No rapidly moving liquid should come in contact with a slower moving liquid or mixing and short-circuiting a flow is sure to take place and part of the liquid may leave too quickly and other parts may be held too long in the holding chamber.

To obtain the uniformity of flow under proper control I provide a chamber of annular cross section of proper volume to secure the holding time required. This chamber is preferably formed of two concentric tubes, the inner tube being sufficiently smaller than the outer tube so that the space between the tubes forms the liquid chamber. This chamber is located in the apparatus in a vertical position and the liquid is admitted at one side at the bottom and flows out from one side at the top so that the liquid swirls upwardly in a helical fashion.

Fig. 1 is a side view, on a small scale, showing one form of apparatus involving my invention, part being broken away.

Fig. 2 is a plan view and cross section on the plane of the line 2—2 of Fig. 1.

Fig. 3 is a vertical section, on a larger scale, of the lower end of the apparatus.

Fig. 4 is a side view of the lower plate taken at right angles to the position of Fig. 1.

Fig. 5 is a side view and partial section of the outer part of the casing.

Fig. 6 is a plan view of the outer casing of Fig. 5.

Fig. 7 is a side view and partial section of the inner part of the casing.

The two ends of the holding chamber are formed by a bottom plate 8 and a top plate 8' which are identical. The bottom plate is provided with an inlet 9 arranged substantially tangential to the recess in the bottom and the top plate is provided with an outlet passage 9' similarly arranged substantially tangential. These two plates may be formed of suitable castings or stampings.

The inner tube 11 and the outer tube 12 may be formed of any suitable material which will not corrode and which will not contaminate the liquid. The outer tube might conveniently be of transparent material such as glass so that the interior action may be observed. To properly position the inner tube with respect to the outer tube and the end plates I provide the loosely interfitting parts such as the socket 13 and the projection 14.

For convenience in manufacture and for strengthening the parts I prefer to permanently secure the socket member 13 in the end of the tube 11 by welding, soldering, brazing or in any other suitable manner. It will be understood, of course, that the upper end of the tube 11 is similarly centered in the top plate 8'.

The opposite ends of the outer tube 12 are preferably provided with flanges or rings 15 and 15' respectively, which are also preferably permanently secured to the tube by soldering, welding or in some other suitable manner so as to reenforce the tube and provide means for securing it to the end plates. The end plates are provided with end flanges 16 and 16' which correspond generally with the flanges 15 and 15' respectively. For the purpose of securing the parts together I preferably provide studs 17 which are permanently set in the rings 15 and 15' respectively and adapted to receive the clamp or thumb nuts 18, 18. A suitable gasket or washer 19, for instance, of compressible rubber is provided to ensure a tight joint between the bottom plate and the flanges at the ends of the tube 12.

This construction forms a holding chamber 20 of annular cross section having an entrance at one side of the bottom of the cup-like bottom plate 8 and an exit at one side of the corresponding top plate 8'. As shown in Fig. 3 the cross section of the entrance 9 is preferably of a diameter the same as the width of the chamber 20.

The stream of liquid enters the holding chamber on a tangent at a fairly high velocity and whirls around horizontally in the space between the inner and outer tubes and being continually urged upwardly from the bottom swirling action is created and maintained at substantially even high velocity until the liquid reaches the top and flows out through the outward passage 9' tangentially from the holding chamber. The exit in the top plate being in the same direction as the rotation and tangent to the holding chamber assists in maintaining this uniformity of rotation or swirling action. All of the liquid is thus kept moving in a substantially uniform speed throughout the chamber and a uniform sequence of flow is maintained without the use of baffles or lengthy pipes.

In a commercial continuous flow pasteurization system designed to handle one hundred gallons per hour I provide an outer tube of four inch diameter and an inner tube of three inch diameter, thus leaving a space one-half inch wide between the tubes to constitute the holding chamber. The tangential entrance and exit to such chamber is one-half inch inner diameter. The height of the device is made to secure the required volume capacity for the required holding time. The dimensions may, of course, be varied. Slowing the entrance speed has a tendency to decrease the efficiency. Efficiency is also decreased when there is a difference in diameter between the entering tube and the width of the chamber.

I claim:

1. A holding device for a pasteurizing system in which the heated liquid flows from a heating chamber to a cooling coil including, two concentric tubes with an unobstructed annular space between them and end plates for said tubes having inlet and outlet passages arranged tangentially so that liquid admitted at one end flows helically around the inner tube inside of the outer tube and out at the other end in a helical stream, said end plates sealing the ends of the tubes and detachably holding them in place, the diameter of the inlet and outlet passages with respect to the cross section of the space between the inner and outer tubes being such as to permit a predetermined volume of liquid to flow through the inlet and throughout the entire length of the space between the tubes and out of the outlet at a substantially continuous and unaltered rate of flow.

2. A holding device having cup-like end plates with tangential inlet and outlets respectively, a central member having its ends removably positioned in the end plates, an outer tubular member surrounding the central member to form an unobstructed passage for the helical movement of liquid from the inlet to the outlet and means for detachably securing the end plates to the outer tubular member.

3. A holding device having cup-like end plates with tangential inlet and outlets respectively, a central cylindrical member having its ends positioned in the end plates, an outer tubular member surrounding the central member to form an unobstructed passage between the members for the helical movement of liquid from the inlet to the outlet and means for securing the end plates to the outer tubular member, the relation of the capacity flow of the inlet and outlet members, with respect to the space between the inner and outer tubes, being such as to permit a predetermined volume of fluid to flow through the inlet, throughout the entire length of the space between the tubes and out of the outlet at a substantially continuous and unaltered rate of flow.

4. A holding device for an electrical pasteurizing system in which the heated liquid flows from a heating chamber to a cooling device including, concentric inner and outer members with an unobstructed annular space between them and readily separable end plates having inlet and outlet passages arranged tangentially so that liquid admitted at one end flows helically around the inner member inside of the outer member and out at the other end, the relation of the capacity flow of the inlet and outlet members, with respect to the space between the inner and outer tubes, being such as to permit a predetermined volume of fluid to flow through the inlet, throughout the entire length of the space between the tubes and out of the outlet at a substantially continuous and unaltered rate of flow.

5. A holding chamber for a milk pasteurizer having two end closure members each having a projecting flange and a circular interior recess with a tubular extension leading to its recess and tangentially thereto and constituting respectively inlet and outlet members, a cylindrical inner member detachably supported in said recesses between the end closure members, an outer cylindrical body surrounding the inner cylindrical member and having flanges at its ends, and screws for detachably connecting the flanges on the end closure members to the flanges of the outer cylindrical member, the recesses being open for cleaning when the outer and inner cylindrical members have been removed.

BENJAMIN E. GETCHELL.